United States Patent Office 3,359,324
Patented Dec. 19, 1967

3,359,324
METHOD OF PREPARING 2,3-DIMETHYL-4-PENTENAL
Donald H. Hirsh, South Charleston, W. Va., assignor to Union Carbide Corporation, a corporation of New York
No Drawing. Filed Feb. 1, 1961, Ser. No. 86,297
2 Claims. (Cl. 260—601)

The present invention relates to certain novel compounds; methods for their preparation and to a combination of steps for producing 2-methyl-2-(sec-butyl)-1,3-propanediol which when subjected to sequential treatment with phosgene and ammonia produces 2-methyl-2-(sec-butyl) - 1,3 - propanedicarbamate, an anti-hypertensive agent. More particularly, one aspect of this invention is directed to a novel method which includes the process steps of reacting propionaldehyde and crotyl alcohol to produce dicrotyl acetal of propional, heating said dicroty acetal of propional to produce a mixture comprising 1-propenyl crotyl ether and 2,3-dimethyl-4-pentenal and reacting said 2,3-dimethyl-4-pentenal and formaldehyde to produce 2,3-dimethyl-2-hydroxymethyl - 4 - pentenal and subsequently hydrogenating the same to provide 2-methyl-2-(sec-butyl)-1,3-propanediol.

The reactions whereby 2-methyl-2-(sec-butyl)-1,3-propanediol are produced in accordance with the methods of the invention can be illustrated by the following series of reaction schemes whereby propionaldehyde reacts with crotyl alcohol to produce dicrotyl acetal of propional:

$$CH_3CH_2CHO + 2CH_3CH=CHCH_2OH \xrightarrow{H+}$$
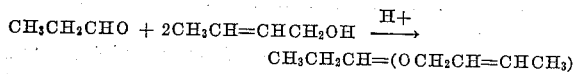
$$CH_3CH_2CH=(OCH_2CH=CHCH_3)_2$$

The above reaction is carried out in the presence of an acidic catalyst of the Lewis acid type and includes acidic catalysts, such as sulfuric acid, phosphoric acids, hydrochloric acid, the aryl sulfonic acids, and the like, in amounts ranging from about 0.01 to about 1.0 weight percent, based on the total weight of reactants.

The proportion of reactants can be varied over the range of from about 2.0–10 moles of crotyl alcohol per mole of propionaldehyde with preferably a molar excess of crotyl alcohol being employed.

The reaction is normally carried out at a temperature in the range of from about 25° C. to about 70° C., although temperatures higher or lower than the above prescribed range can be employed if desired. At a temperature in the range set forth above, the reaction time will vary from one-half hour to about three hours depending upon the temperature employed, after which the catalyst is preferably neutralized with an excess sodium salt of a weak acid, such as sodium acetate and dicrotyl acetal of propional recovered, if desired, from unreacted starting materials by any suitable means such as fractional distillation.

Dicrotyl acetal of propional is then heated to isomerization temperatures in the presence of an amount of an acidic catalyst such as described above for a period of time suffiicent to produce a mixture comprising 1-propenyl crotyl ether and 2,3-dimethyl-4-pentenal, as illustrated below:

$$CH_3CH_2CH=(OCH_2CH=CHCH_3)_2 \xrightarrow[\Delta]{H+}$$
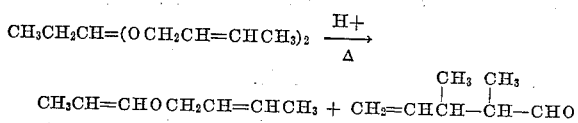
$$CH_3CH=CHOCH_2CH=CHCH_3 + CH_2=CH\underset{|}{\overset{CH_3}{C}}H-\underset{|}{\overset{CH_3}{C}}H-CHO$$

The isomerization reaction can be carried out in a conventional tubular reactor at a temperature of at least 250° C. and preferably at a temperature in the range of from 300° C. to about 400° C. At temperatures in the above range, contact time in the reactor vary from about 1 second to about 100 seconds. Optimum benefits are obtained at contact times in the range of from 5 seconds to 15 seconds. The product can then be condensed and recovered by fractional distillation to separate 2,3-dimethyl-4-pentenal from the starting material; dicrotyl propional.

Alternatively, 2,3-dimethyl-4-pentenal can be produced in two steps which involve a liquid phase dealcoholation of dicrotyl acetal of propional to produce 1-propenyl crotyl ether and crotyl alcohol, as illustrated below:

$$CH_3CH_2CH=(OCH_2CH=CHCH_3)_2 \longrightarrow$$
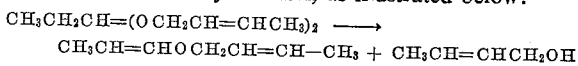
$$CH_3CH=CHOCH_2CH=CH-CH_3 + CH_3CH=CHCH_2OH$$

The crotyl alcohol can then be separated from the product mixture by extraction with ethylene glycol or other suitable material which is a solvent for crotyl alcohol but a non-solvent for 1-propenyl crotyl ether.

In proceeding via the liquid phase dealcoholation of dicrotyl acetal of propional an acidic catalyst of the nature of and amounts as set forth above are employed and the reaction temperature will vary in the range of from 100° C. to about 250° C. at reduced pressures of the order of about 100 millimeters of Hg absolute. The crotyl alcohol co-product can then be separated from the product mixture in the manner set forth above.

The second of the two steps referred to above in producing 2,3-dimethyl-4-pentenal involves the vapor phase isomerization of 1-propenyl crotyl ether as illustrated below:

$$CH_3CH=CHO-CH_2CH=CHCH_3 \xrightarrow{\Delta} CH_2=CH\underset{|}{\overset{CH_3}{C}}H-\underset{|}{\overset{CH_3}{C}}H-CHO$$

by heating said ether at isomerization temperatures in the range as set forth above for the single step conversion of dicrotyl propional to 2,3-dimethyl-4-pentenal. In this case no acidic catalyst is necessary.

Still another method can be employed advantageously to produce 2,3-dimethyl-4-pentenal directly from propionaldehyde and crotyl alcohol which comprises heating to isomerization temperatures a reaction mixture of propionaldehyde and crotyl alcohol in the presence of an acidic catalyst as set forth above. The crotyl alcohol co-product is separated as set forth above and can be recycled if desired.

The 2,3-dimethyl-4-pentenal is then conveniently converted to 2-methyl-2-(sec-butyl)-1,3-propanediol by reacting 2,3-dimethyl-4-pentenal and formaldehyde to produce 2,3-dimethyl - 2 - hydroxymethyl - 4 - pentenal and subsequently reacting the same with hydrogen under hydrogenation conditions in the presence of a hydrogenation catalyst to produce 2-methyl-2-(sec-butyl)-1,3-propanediol.

Alternatively, if desired, 2,3-dimethyl-4-pentenal is partially hydrogenated to produce 2,3-dimethylpentaldehyde and subsequently reacting the same with formaldehyde in the presence of a basic catalyst to produce 2,3-dimethyl-2-hydroxymethylpentaldehyde and reacting the same with hydrogen under hydrogenating conditions in the presence of a hydrogenation catalyst to produce the desired 2-methyl - 2 - (sec-butyl)-1,3-propanediol. This procedure may be varied if desired in that the 2,3-dimethyl-4-pentenal can be fully hydrogenated under hydrogenating conditions to saturate the olefinic bond as well as reduce the aldehyde group to an alcohol group and produce 2,3-dimethylpentanol and subsequently dehydrogenating the same under dehydrogenating conditions to produce 2,3-dimethylpentaldehyde which is then reacted with formaldehyde to produce 2,3-dimethyl-2-hydroxymethylpentaldehyde and which upon subsequent reaction with hydrogen under hydrogenation conditions in the presence of a hydrogenation catalyst provides 2-methyl-2-(sec-butyl)-1,3-propanediol.

The hydrogenating conditions referred to above are achieved by charging the desired reactant to a pressure vessel containing a hydrogenation catalyst, such as palladium, platinum, Raney nickel and the like, pressurizing the vessel with hydrogen to a pressure of about 50 to 100 pounds per square inch gage. The reaction temperatures involved generally will be in the range of from 75° C. to 100° C. with reaction times of from about one-half hour to about five hours. When the compound to be reduced also contains an aldehyde group, it is preferable to include from about 0.1 to 1.0 weight percent based on the weight of starting material of a sulfur-containing catalyst poison, such as barium sulfate, in order to prevent the reduction of the aldehyde group to the alcohol.

The reaction with formaldehyde referred to above is effected in the presence of a catalytic amount of a base such as calcium hydroxide. This reaction is conveniently carried out at room temperature.

The desired anti-hypertensive agent, 2-methyl-2-(sec-butyl)-1,3-propanedicarbamate, can then be readily produced by bubbling phosgene gas through a liquid mixture of the diol until at least one mole of phosgene per equivalent of hydroxyl group has been consumed to produce the 2-methyl-2-(sec-butyl)-1,3-propanedichloroformate. Care should be exercised during the addition of phosgene to the liquid mixture to insure that the amount of phosgene added does conform to the above-recommended amounts since an excess of the diol in the reaction can yield the carbonate or dicarbonate. If the reaction is carried out with excess phosgene, the dichloroformate results. The dichloroformate can then be separated, if desired, after the hydrogen chloride formed during the reaction is neutralized and reacted with at least two moles of ammonia to produce 2 - methyl - 2-(sec-butyl)-1,3-propanedicarbamate.

Alternatively, it is sometimes desirable to simultaneously react ammonia, phosgene and the diol in an anhydrous solvent to produce the dicarbamate of 2-methyl-2-(sec-butyl)-1,3-propanediol directly. In this event, care should be taken to provide an excess of phosgene in the reaction mixture over the amount necessary to provide the dichloroformate to insure the intermediate formation of the carbamyl chloride which subsequently reacts with the diol to provide the dicarbamate thereof.

The following examples will serve to illustrate the invention:

*Example I.—Preparation of dicrotyl propional (propionaldehyde, dicrotyl acetal)*

A 2.5 to 1.0 mol ratio of crotyl alcohol to propionaldehyde was reacted as follows: the crotyl alcohol and 0.05 percent by weight sulfuric acid, based on total weight of reactants, was placed in a stirred reaction vessel, and the propionaldehyde fed over a period of an hour, maintaining a reaction temperature of about 50° C. The mixture was stirred for two additional hours after the aldehyde feed was complete. The sulfuric acid was then neutralized with a 100 percent excess of dilute aqueous sodium acetate. The dicrotyl propional, recovered by distillation in a yield of 55.7 percent by weight based on starting propionaldehyde, had a boiling point of 127.5° C. at 50 mm. Hg pressure, a refractive index, $n_D^{20}$, of 1.4401, and a specific gravity at 20/15.6° C. of 0.873.

*Example II.—Preparation of 1-propenyl crotyl ether*

The distilled acetal from Example I was converted to 1-propenyl crotyl ether by heating at 140 to 150° C. at 100 mm. Hg pressure in the presence of 0.04 percent by weight phosphoric acid. A yield of 1-propenyl crotyl ether of 94.6 percent, based on the acetal, was obtained. Crotyl alcohol was removed from the reaction mixture by extraction with ethylene glycol, and the ether refined by distillation. Physical properties obtained for 1-propenyl crotyl ether are: boiling point, 69° C./100 mm. Hg, $n_D^{20}$; 1.4361; specific gravity at 20/15.6° C., 0.823.

*Example III.—Preparation of 2,3-dimethyl-4-pentenal*

The 1-propenyl crotyl ether from Example II was converted to 2,3-dimethyl-4-pentenal by isomerization at 380° C. in a tube [1], with a residence time of 11.7 seconds. The product was obtained in better than 95 percent yield. The refractive index of a sample of 2,3-dimethyl-4-pentenal was 1.4270 ($n_D^{20}$), the specific gravity a 20/15.6° C. was 0.8435, and its boiling point was 59° C. at 50 mm. Hg, and 74° C. at 100 mm. Hg pressure.

The following table presents physical and analytical data for the compounds whose preparation is described in the examples. These were not determined for the same products but for products of another synthesis of the same compounds. The rather high purity value obtained for the acetal is not understood since this represents a narrow fraction of a distillation. The ether contained some aldehyde, probably because the distillation temperature was too high, and some isomerization took place.

|  | Dicrotyl acetal of Propional | 1-Propenyl Crotyl Ether | 2,3-Dimethyl 4-Pentenal |
|---|---|---|---|
| Boiling point, ° C./mm. Hg | 127.5/50 | 69/100 | 59/50; 74/100 |
| Sp. g., 20° C./20° C. | 0.872 | 0.822 | 0.843 |
| $n_D^{20}$ | 1.4401 | 1.4361 | 1.4270 |
| MR, observed | 55.73 | 35.72 | 34.20 |
| MR, calculated | 55.35 | 35.24 | 34.17 |
| Purity: |  |  |  |
| By unsaturation, percent |  | 91.1 | 99.95 |
| By hydrolysis and determination of aldehyde, percent | 105.35 | 100.1 | 100.0 |
| Aldehyde content, percent as 2,3-dimethyl-4-pentenal | 3.3 | 14.5 | 98.5 |

I claim:
1. A method of preparing 2,3-dimethyl-4-pentenal which comprises heating 1-propenyl crotyl ether at a temperature of about 250° C. to about 400° C. for a period of about 1 second to about 100 seconds and recovering the 2,3-dimethyl-4-pentenal produced thereby.

2. A method of preparing 2,3-dimethyl-4-pentenal which comprises contacting a mixture of propionaldehyde and crotyl alcohol at a temperature of about 25° C. to about 70° C. with a catalytically effective amount of a Lewis acid catalyst to produce dicrotyl acetal of propional, heating said dicrotyl acetal of propional in contact with a catalytically effective amount of a Lewis acid catalyst at a temperature of from about 100° C. to about 250° C. to produce 1-propenyl crotyl ether, heating said 1-propenyl crotyl ether at a temperature of about 250° C. to about 400° C. for a period of about 1 second to about 100 seconds, and recovering the 2,3-dimethyl-4-pentenal produced thereby.

References Cited

UNITED STATES PATENTS

| 2,962,534 | 11/1960 | Montagne et al. | 260—601 |
| 2,970,174 | 1/1961 | Isler et al. | 260—615 |
| 2,998,456 | 8/1961 | Benoit | 260—614 |
| 2,957,028 | 10/1961 | Brannock et al. | 260—601 |
| 3,006,960 | 10/1961 | Luten et al. | 260—602 |
| 3,011,002 | 11/1961 | Giesen et al. | 260—635 |
| 3,013,082 | 12/1961 | Hagemeyer et al. | 260—601 |
| 3,021,373 | 2/1962 | Montagne et al. | 260—601 |

FOREIGN PATENTS 634,899   12/1959   Canada.

BERNARD HELFIN, *Primary Examiner.*

CHARLES B. PARKER, LEON ZITVER, *Examiners.*

J. J. SETELIK, *Assistant Examiner.*

---
[1] 1″ x 3′ stainless steel tube with an electrically heated Dowtherm jacket.